Sept. 12, 1933.   N. N. SMITH   1,926,313
METHOD AND APPARATUS FOR FRYING ARTICLES OF FOOD
Filed Dec. 30, 1929   2 Sheets-Sheet 2
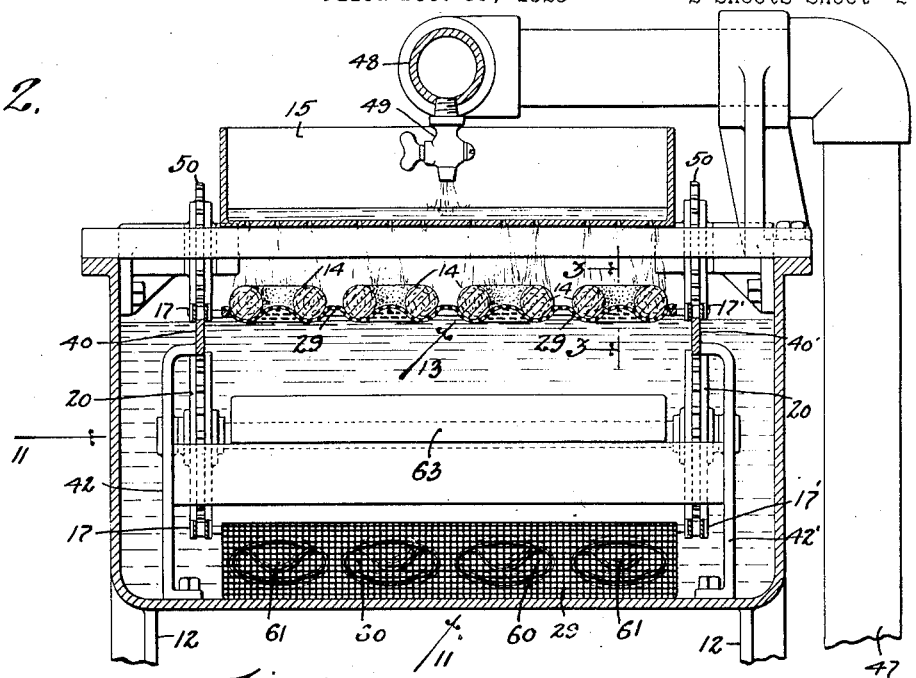
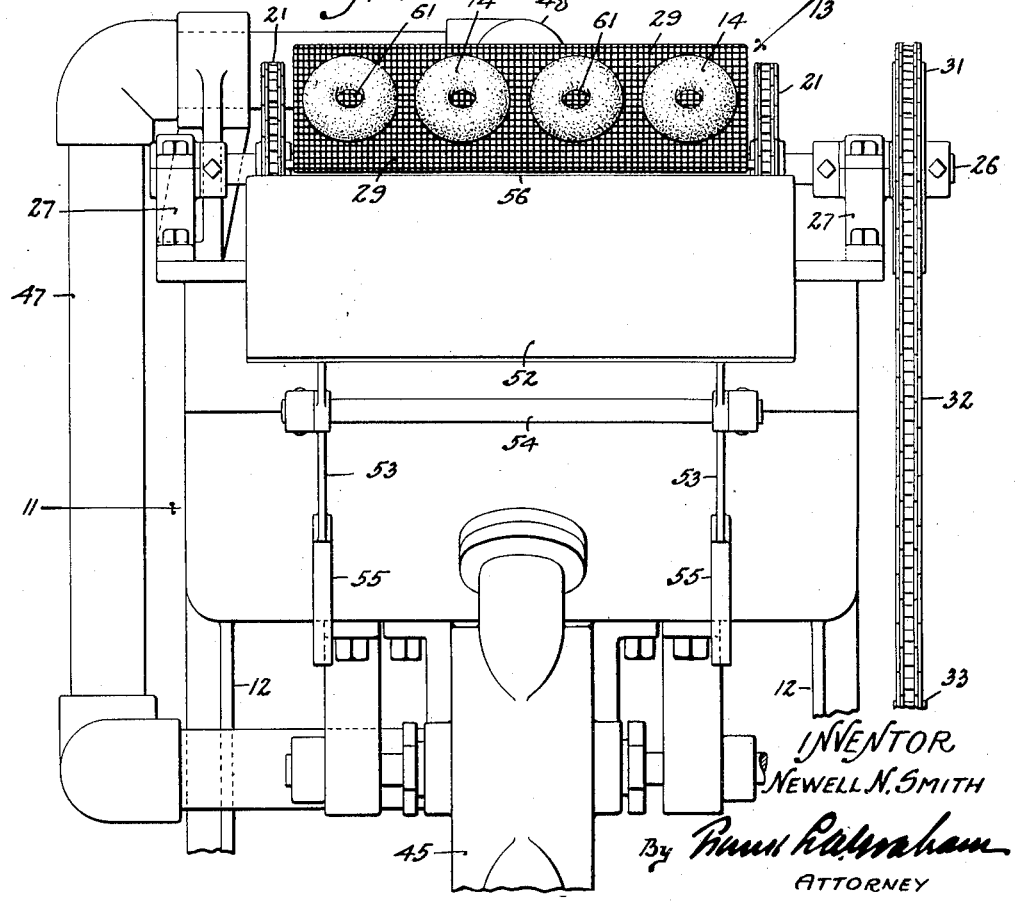
INVENTOR
NEWELL N. SMITH
ATTORNEY Patented Sept. 12, 1933

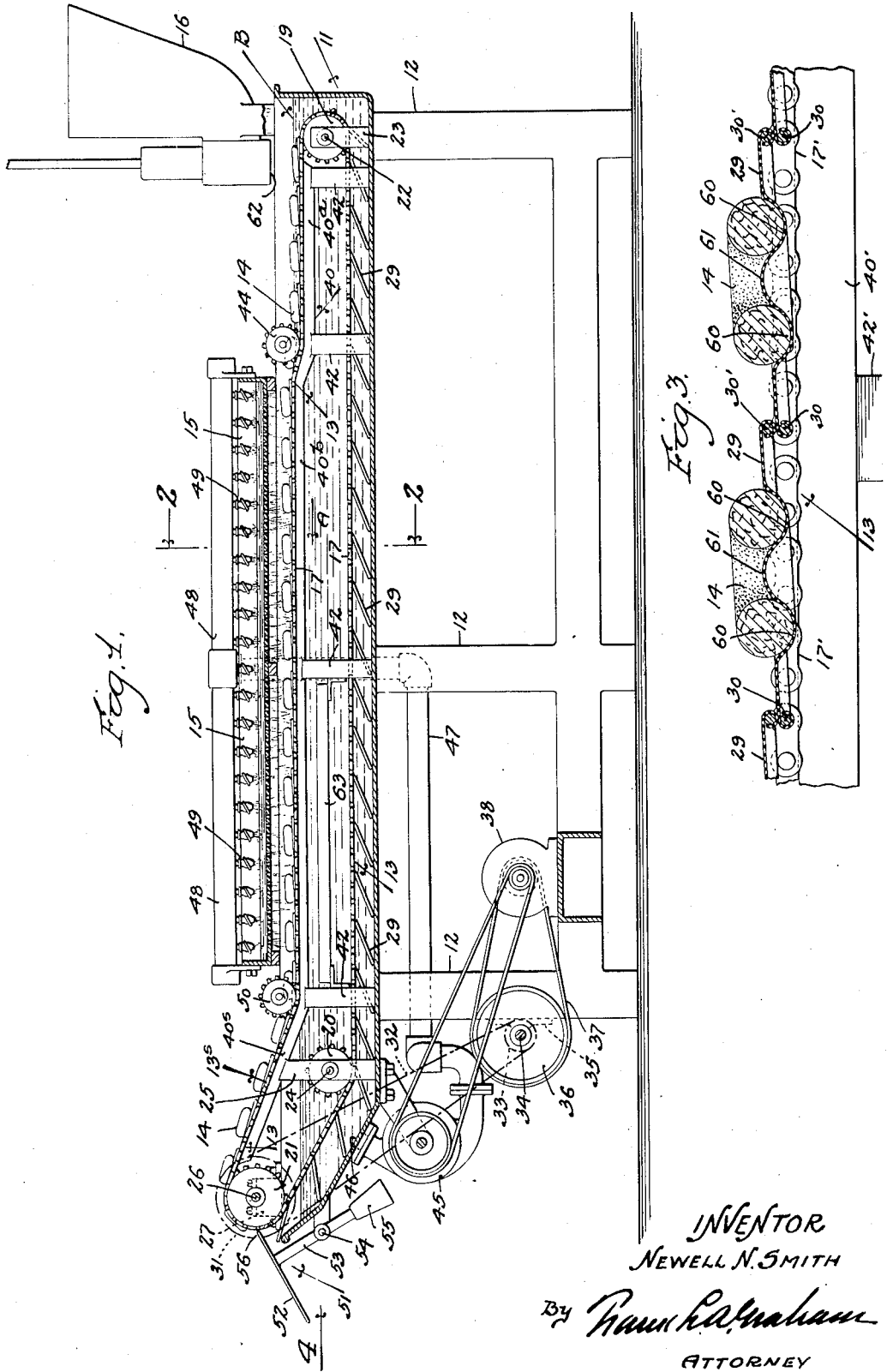

1,926,313

UNITED STATES PATENT OFFICE 1,926,313

METHOD AND APPARATUS FOR FRYING ARTICLES OF FOOD

Newell N. Smith, Los Angeles, Calif., assignor to Davis Standard Bread Company, a corporation of California Application December 30, 1929
Serial No. 417,448

9 Claims. (Cl. 53—7)

This invention has to do in a general way with the art of frying articles such as doughnuts, fried pies, etc. The usual procedure followed, in frying articles of the class described, is to drop the articles to be fried into a vat of hot grease where they lighten and float until fried on one side and are then turned over and fried on the other side. In some instances, the articles to be fried are placed in a basket and are completely submerged in a body of hot grease. In the former method, where the articles, such as fried pies, are of a very frail nature, they are frequently crumbled and broken during the turning operation and in both of these methods the articles absorb considerable grease during the frying operation. Attempts have been made to decrease the greasiness of fried articles of food of this nature by changing the ingredients in the dough, but such efforts are generally accompanied by a decrease in the quality of the food.

The primary object of this invention is to produce a process and an apparatus for frying articles of food of the class described wherein the articles are fried in a manner such that they will absorb a minimum quantity of grease. This object is accomplished by advancing the articles through a spray or shower of hot grease. In some instances the articles may, depending upon their form, be fried on one side by advancing them through a body of hot grease and then fried on the other side by lifting them out of the grease and passing them through the spray mentioned above. However, in the case of doughnuts and the like, the doughnuts are preferably dropped into perforated trays which are submerged in a body of hot grease. The trays are advanced with the soft dough resting thereon until such time as the gases released in the dough have caused it to swell and assume the proper form. Prior to any frying action in the grease the trays are lifted out of the grease and are passed through the shower or spray which spreads over the articles on the trays frying them and bringing the entire surface of the articles to uniform color. This latter method of frying prevents the bursting of the articles which frequently occurs on the exposed side when the articles are fried in deep grease, due to the passage of released gas from the exposed upper side of the floating article as the crust forms on the bottom side thereof. I have found in the practice of my invention in frying doughnuts, that the hot grease sprayed thereon forms a continuously moving film completely covering the doughnut, causing the uniform formation of a crust and obviating the possibility of the doughnuts bursting.

It is a noteworthy feature of the machine contemplated by this invention, that it embodies a conveyor adapted to support the articles in the grease, lift them out of the grease, advance them through a shower or spray of grease and deliver the fried articles from the machine.

The machine contemplated by this invention is of simple form and construction. It is designed for continuous operation and is of such a character that several of the machines can be controlled by a single operator.

It is an object of this invention to produce a machine, of the class described, which is especially adapted for use in connection with a doughnut forming machine, such as is disclosed in my former Patent No. 1,703,434 issued on February 26, 1929.

The process and the details of a preferred form of apparatus contemplated by this invention will be best understood from the following description of the accompanying drawings, which are chosen for illustrative purposes only, and in which, Fig. 1 is a sectional elevation, taken through a preferred form of machine which is used in practicing the process contemplated by this invention, Fig. 2 is a sectional elevation, which may be considered as having been taken substantially in a plane represented by the line 2—2 in Fig. 1, Fig. 3 is an enlarged partial sectional elevation taken in a plane represented by the line 3—3 in Fig. 2, Fig. 4 is an elevational view which may be considered as having been taken in the direction of the arrow 4 in Fig. 1.

More particularly describing the invention as herein illustrated, reference numeral 11 indicates a tank or a vat which contains a hot frying medium such as grease or oil, and is shown as being supported upon legs or standards 12. A traveling carrier 13 is mounted in the tank 11 and is adapted to move in the direction of the arrow A and thereby carry articles to be fried, which are indicated by reference numeral 14, beneath a drip pan 15, or other suitable spray producing member such as a coil or bank of tubing having perforations therein. This member is situated above a part of the tank 11 and in the event tubing is used, I prefer to place the perforations in the top of the tubes.

Reference numeral 16 indicates a doughnut forming machine, which is preferably of the type shown and described in my former Patent No. 1,703,434 referred to above.

The conveyor 13 embodies a pair of parallel traveling members in the form of endless chains, indicated by reference numerals 17 and 17'. These traveling members pass over sets of sprocket wheels 19, 20 and 21. The sprocket wheels 19 are mounted upon a shaft 22 which has its bearings in standards 23 supported on the bottom of the tank 11. The sprocket wheels 20 are similarly mounted upon a shaft 24 which is rotatably mounted between standards 25. The sprocket wheels 19 and 20 are shown as having their axes in substantially the same horizontal plane, but the sprocket wheels 21 are supported in an elevated position on a shaft 26 which is supported between bearing plates 27, mounted upon the end of the tank. A plurality of perforated trays 29, are pivotally mounted between the two parallel traveling members 17 and 17' in the manner most clearly illustrated in Figs. 2 and 3. These trays are preferably made of screen or similar material and have their edges reinforced by a rod or rods, indicated at 30 and 30'. The rods on the leading edges of the trays have their ends pivotally mounted in the traveling members 17 and 17'. The trays 29 are made of a width such that the trailing edge 30', of each tray, overlaps and rides upon the leading edge of the following tray. From this construction, it will be seen that all of the trays lie substantially flat as they are passed along the upper course of their travel, but that they drag on the bottom of the tank or swing downwardly while they are passing on the bottom course of their travel. The conveyor 13 is driven in any suitable manner, such as by means of a pulley or sprocket wheel 31 which is mounted on the shaft 26, and receives its movement through the medium of a belt or chain 32. The chain 32 is driven by a drive pulley or sprocket wheel 33 mounted on a shaft 34 which is carried between bearings 35 shown as being mounted upon one of the set of legs or standards 12 and has mounted thereon a pulley 36 which is driven though the medium of a belt 37 by a motor or any other suitable source of power, indicated at 38.

In frying articles by the process contemplated by this invention, the articles to be fried are preferably first dropped into a body of hot grease where they are supported by the trays 29. The trays 29 are situated so that the articles received thereby are either partially or completely submerged in the grease while they are advanced through a distance sufficient to permit them to swell to the proper form or in some instances to be fried on one side. They are then raised out of the main body of grease and are passed through a spray or shower of hot grease which comes from the drip pan or its equivalent structure.

For the purpose of raising the trays 29 and the articles carried thereon, out of the grease after a predetermined interval of time, I provide the tank 11 with a set of guide members indicated by reference numerals 40 and 40'. These guide members may be considered as being in the form of stepped or bent plate tracks, which are mounted upon a series of upright supports indicated by reference numerals 42 and 42'. In the operation of this machine, the grease level, in the tank 11, is maintained at substantially the point indicated at B in Fig. 1. This grease level is slightly above the top of the lower track section 40a. The next portion of the track 40 is elevated to an upper level 40b which is slightly above the level of the grease B. For the purpose of holding the traveling members 17 and 17' in engagement with the track in the stepped portion thereof, I provide a set of rollers at this point which are indicated by reference numeral 44.

During the operation of the machine, hot grease is continuously pumped from the main tank 11 into the drip pan 15, by means of a circulating system shown as comprising a pump 45 which has its inlet in the bottom of the tank, as indicated at 46 and has an outlet pipe 47 which communicates with a delivery pipe 48. The delivery pipe 48 is situated above the drip pan 15 and is shown as being provided with a plurality of spaced petcocks 49 by means of which the flow of hot grease into the drip pan may be evenly distributed throughout its length.

In order that the articles may be continuously delivered from the tank 11, after they have been fried by passing beneath the drip pan 15, I provide the conveyor with an upwardly sloping portion indicated at 13s. The track 40 is of course sloped upwardly toward the top of the sprocket wheel 26 as indicated at 40s and I provide guide rollers 50 at the point at which the conveyor makes the upward bend, for the purpose of holding the traveling members upon the guide.

Reference numeral 51 indicates a yieldable delivery tray which comprises a plate 52 mounted on the upper end of standards 53 which are pivotally mounted upon a transverse shaft 54 and one or both of which are provided with a weight or weights 55 adapted to hold the upper edge 56 of the plate 52 in constant contact with that trap which is passing around the sprocket wheel 21. The trays 29, as they pass around the sprocket wheel 21, swing outwardly consequently, it is important for the proper reception of fried articles, to make the plate 52 of such a character that it will be constantly held in yieldable engagement with the trays.

In order that the articles being fried will be held in the proper position upon the trays during their movement through the machine, I prefer to provide the trays 29 with a series of depressions indicated by reference numeral 60, which, in case the machine is being used for frying doughnuts, are made in the form of depressed rings having a raised center portion 61.

The operation of the conveyor and the doughnut forming machine are timed in a manner such that the machine 16 delivers a series of doughnuts into the tank 11 when one of the trays 29 is situated below the outlet 62 of the forming machine 16.

Reference numeral 63 indicates a heater which is preferably thermostatically controlled and may be of any desired character, for the purpose of heating the grease in the tank 11 to a temperature sufficient to fry the articles of food being cooked.

From the foregoing description, it will be apparent that the process, contemplated by this invention, is designed to fry articles of the character described above without excessive absorption of grease and without subjecting them to the possibility of breaking or crumbling, which might otherwise occur in the event the articles were turned in the grease.

It is to be understood that while I have herein described and illustrated one preferred form of machine, whereby the process contemplated by my invention may be practiced, that the invention is not limited to the precise construction or manner of operation set forth above, but includes within its scope such modifications or changes as may fairly come within the spirit of the appended claims.

I claim as my invention:

1. A frying machine embodying: a spray producing member adapted to receive a hot frying medium; and perforated tray conveying means for advancing articles to be fried beneath said spray producing member.

2. A frying machine embodying: a spray producing member adapted to receive a hot frying medium; a tank situated below said spray producing member; and a traveling conveyor consisting of perforated trays supported in said tank and adapted to advance articles to be fried beneath said spray producing member.

3. A frying machine embodying: a spray producing member adapted to receive a hot frying medium; tank situated below said spray producing member; and a conveyor in said tank comprising traveling members, perforated trays mounted between said traveling members for receiving articles to be fried, and means for advancing said traveling members so as to carry said trays beneath said spray producing member.

4. A frying machine embodying: a spray producing member adapted to receive a hot frying medium; a tank situated below said spray producing member; and a conveyor in said tank comprising traveling members, perforated trays mounted between said traveling members for receiving articles to be fried, and means for advancing said traveling members so as to carry said trays beneath said spray producing member, said trays being arranged so that their edges overlap.

5. A frying machine embodying: a spray producing member adapted to receive a hot frying medium; a tank situated below said spray producing member; and a conveyor in said tank comprising traveling members, perforated trays mounted between said traveling members for receiving articles to be fried, and means for advancing said traveling members so as to carry said trays beneath said spray producing member, said trays being provided with circular depressions to hold the articles being fried against movement thereon.

6. A frying machine embodying a spray producing member adapted to receive a hot frying medium; a tank situated below said spray producing member; a conveyor in said tank comprosing traveling members, perforated trays mounted between said traveling members for receiving articles to be fried, and means for advancing said traveling members so as to carry said trays beneath said spray producing member; and guide means in said tank for changing the elevation of said trays during the movement of said conveyor.

7. A frying machine embodying a spray producing member adapted to receive a hot frying medium; a tank situated below said spray producing member and adapted to contain a hot frying medium; a conveyor in said tank comprising traveling members, perforated trays mounted between said traveling members for receiving articles to be fried, and means for advancing said traveling members so as to carry said trays beneath said spray producing member; and guide means in said tank for lifting said trays from the frying medium in said tank as they are moved beneath said spray producing member.

8. A frying machine embodying a tank containing a hot frying medium; a conveyor in said tank consisting of spaced traveling members and trays mounted therebetween; means for producing a spray of hot frying medium mounted over a part of said tank; means for advancing said conveyor through said spray; and guide means in said tank for lifting said trays out of the frying medium in said tank as they pass through said spray.

9. A method of frying articles which includes the steps of first dropping same in a body of hot grease removing them from the body of hot grease and then spraying them with hot grease.

NEWELL N. SMITH.